(12) United States Patent
Drennan

(10) Patent No.: US 8,792,921 B2
(45) Date of Patent: Jul. 29, 2014

(54) SYSTEM AND METHOD FOR SENDING LOCATION-BASED MESSAGES USING DATA TRANSMITTED BETWEEN BASE STATIONS AND MOBILE SWITCHING DEVICES

(75) Inventor: Mark N. Drennan, Fort Collins, CO (US)

(73) Assignee: Unwired Planet, LLC, Reno, NV (US)

( * ) Notice: Subject to any disclaimer, the term of this patent is extended or adjusted under 35 U.S.C. 154(b) by 96 days.

(21) Appl. No.: 13/191,175

(22) Filed: Jul. 26, 2011

(65) Prior Publication Data

US 2012/0021772 A1 Jan. 26, 2012

Related U.S. Application Data

(60) Provisional application No. 61/367,846, filed on Jul. 26, 2010.

(51) Int. Cl.
*H04W 4/00* (2009.01)
(52) U.S. Cl.
USPC .................. 455/466; 455/456.1; 455/455

(58) Field of Classification Search
USPC ............................. 455/456.1–456.6
See application file for complete search history.

(56) References Cited

U.S. PATENT DOCUMENTS

2006/0003775 A1* 1/2006 Bull et al. ............... 455/456.1

* cited by examiner

*Primary Examiner* — Vladimir Magloire

(57) ABSTRACT

A system and method for sending location-based messages to mobile communication devices utilizes communications between base stations and mobile switching devices of a mobile access network to calculate the latest locations of the mobile communication devices supported by the mobile access network. The calculated locations of the mobile communication devices are maintained as location data in at least one location database, as well as information about the mobile communication devices. The location data and the information about the mobile communication devices are used to send the location-based messages to the mobile communication devices located within a specified geographical area.

18 Claims, 4 Drawing Sheets

SYSTEM AND METHOD FOR SENDING LOCATION-BASED MESSAGES USING DATA TRANSMITTED BETWEEN BASE STATIONS AND MOBILE SWITCHING DEVICES

CROSS-REFERENCE TO RELATED APPLICATION

This application is entitled to the benefit of provisional U.S. Patent Application Ser. No. 61/367,846, filed Jul. 26, 2010, which is incorporated herein by reference.

BACKGROUND

Mobile communication devices are widely used among various user groups. Conventional mobile communication devices allow users to communicate with one another via voice, text, and multimedia messages. Also, many mobile communication devices allow users to access information available over the Internet. Thus, mobile communication devices increase the ability and the number of ways that people can communicate with each other.

With the wide use of mobile communication devices, there is a strong demand to send location-based messages, including notifications, to users of these mobile communication devices. Various service providers and advertisers are particularly interested in sending location-based messages, including commercial and emergency notifications, to users of mobile communication devices based on the current locations of the mobile communication devices.

There are various techniques to determine the current locations of mobile communication devices. Some of these location techniques are handset-based techniques, which require special hardware, such as a Global Positioning System (GPS), and/or software in the mobile communication devices to provide geographical location information of the mobile communication devices to the network access provider. Other location techniques are network-based techniques, which require the network infrastructure of the network access providers to extract the geographical location information of the mobile communication devices using various data transmitted between the network access providers and the mobile communication devices.

A concern with the handset-based location techniques is that not all mobile communication devices may have the appropriate hardware and/or software to provide the geographical location information, which means a different location technique must be used to determine the locations of these mobile communication devices. A concern with the network-based location techniques is that the constant process of determining the locations of the mobile communication devices will significantly tax the network infrastructure.

In view of the above concerns, there is a need for a system and method for sending location-based messages to mobile communication devices without requiring special hardware and/or software in the mobile communication devices, and without taxing the network infrastructure.

SUMMARY

A system and method for sending location-based messages to mobile communication devices utilizes communications between base stations and mobile switching devices of a mobile access network to calculate the latest locations of the mobile communication devices supported by the mobile access network. The calculated locations of the mobile communication devices are maintained as location data in at least one location database, as well as information about the mobile communication devices. The location data and the information about the mobile communication devices are used to send the location-based messages to the mobile communication devices located within a specified geographical area.

A system for sending location-based messages to mobile communication devices in accordance with an embodiment of the invention comprises a plurality of location tracking servers and a messaging control system. The plurality of location tracking servers is operably coupled to a mobile access network to receive data of communications between base stations and mobile switching devices of the mobile access network. Each of the location tracking servers is configured to calculate latest locations of the mobile communication devices supported by the mobile access network as location data using the received data of communications. The location tracking servers are further configured to maintain at least one location database that includes information of the mobile communication devices supported by the mobile access network and the location data. The messaging control system is operably coupled to the location tracking servers. The messaging control system is configured to generate the location-based messages for a target geographical area and to send the location-based messages to the mobile communication devices within the target geographical area using at least the information of the mobile communication devices supported by the mobile access network and the location data that corresponds to the latest locations of the mobile communication devices in the at least one location database.

The system may further comprise a plurality of network probes coupled to signal paths between the base stations and the mobile switching devices of the mobile access network to extract the data of communications between the base stations and the mobile switching devices. The location tracking servers are operably coupled to the network probes to receive the data of communications extracted by the network probes.

A method for sending location-based messages to mobile communication devices in accordance with an embodiment of the invention comprises receiving data of communications between base stations and mobile switching devices of a mobile access network, calculating latest locations of the mobile communication devices supported by the mobile access network as location data using the received data of communications between the base stations and the mobile switching devices, maintaining at least one location database that includes information of the mobile communication devices supported by the mobile access network and the location data, generating location-based messages for a target geographical area at a messaging control system, and sending the location-based messages from the messaging control system to the mobile communication devices within the target geographical area using at least the information of the mobile communication devices supported by the mobile access network and the location data that corresponds to the latest locations of the mobile communication devices in the at least one location database.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
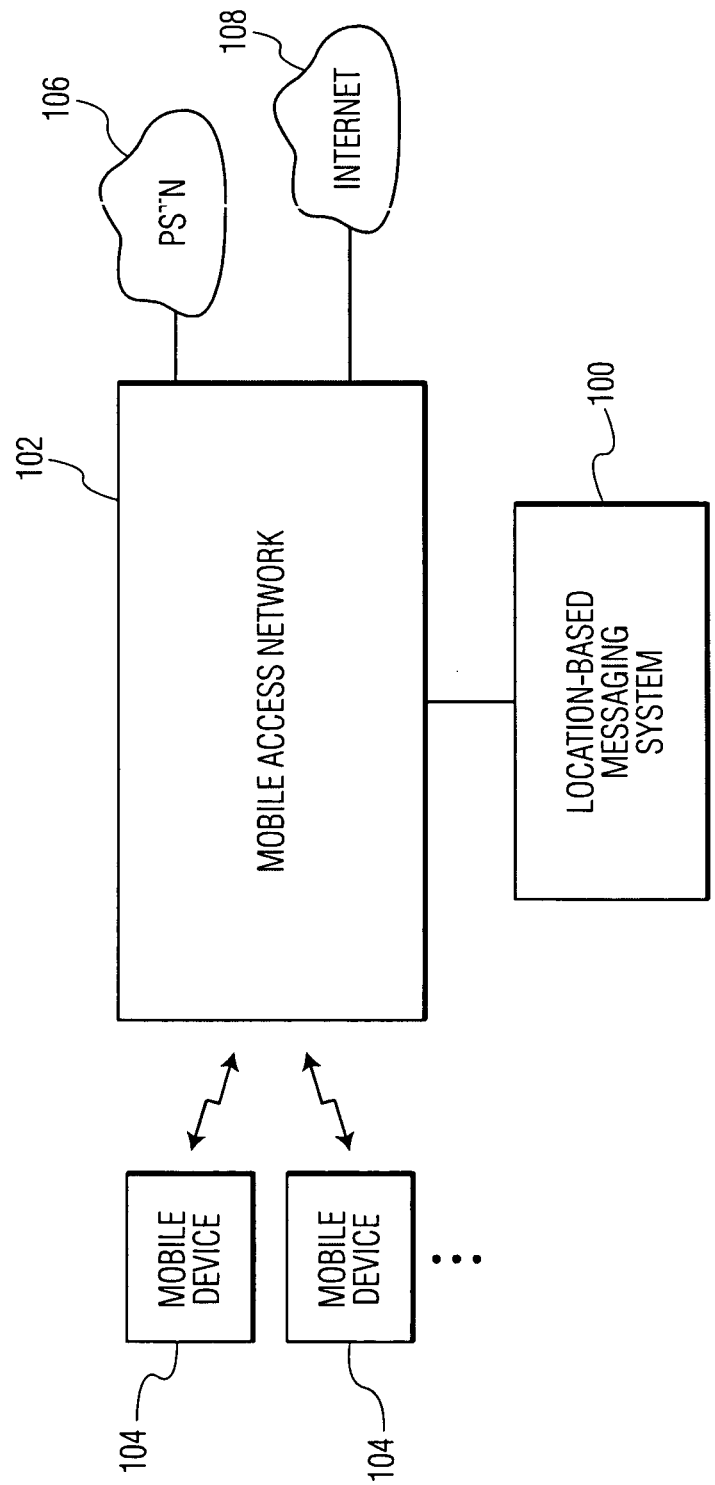
FIG. 1 is a block diagram of a mobile communication network that includes a location-based messaging system in accordance with an embodiment of the invention.

Turning now to FIG. 1, a mobile communication network that includes a location-based messaging system 100 in accordance with an embodiment of the invention is shown. As shown in FIG. 1, the mobile communication network includes a mobile access network 102, which allows mobile communication devices 104 to access the public switched telephone network (PSTN) 106 and/or the Internet 108 via the mobile access network. The mobile access network may also be connected to other networks (not shown), such as private telephone networks and/or data networks. In the illustrated embodiment, the location-based messaging system is connected to the mobile access network. The location-based messaging system operates to passively track the locations of the mobile communication devices so that messages can be selectively sent to the mobile communication devices based on the latest determined locations of the mobile communication devices. As described in more detail below, the location-based messaging system is able to determine the locations of the mobile communication devices without the need for special hardware and/or software in the mobile communication devices and without taxing the network infrastructure, i.e., the mobile access network.

The mobile access network 102 can be any type of a mobile access network, such as a Universal Mobile Telecommunication System (UMTS), CDMA2000, Global System for Mobile Communications (GSM), 4G WiMax, 4G LTE or WiFi network, which provides communication services for the mobile communication devices 104. The mobile communication devices are wireless mobile devices that are subscribed to the communication services of the mobile access network. The mobile communication devices can be any type of wireless mobile devices, such as laptop computers, cell phones, smartphones, personal digital assistants (PDAs) and netbooks. The mobile communication devices may be Internet-enabled devices. Thus, some of the mobile communication devices can access the Internet 108 via the mobile access network. Since the mobile access network provides communication services, including access to the Internet, the mobile access network handles and processes various communications between the mobile communication devices and the mobile access network and information relating to the mobile communication devices supported by the mobile access network, which are used by the location-based messaging system 100 to passively determine the latest locations of the mobile communication devices, as described in more detail below.

The location-based messaging system 100 operates to calculate the latest locations of the mobile communication devices 104 supported by the mobile access network 102 using at least some communications between the mobile communication devices and the mobile access network and/or information regarding the communications between the mobile communication devices and the mobile access network. The location-based messaging system stores the calculated locations of the mobile communications devices as location data, as well as information about the mobile communication devices, in one or more location databases and periodically updates the databases to track the locations of the mobile communication devices. Thus, the location-based messaging system has access to the latest location information of the mobile communication devices supported by the mobile access network, which can be used to send location-based messages, including commercial and emergency notifications, to the mobile communication devices based on their latest locations as specified in the location databases.

Figure 2:
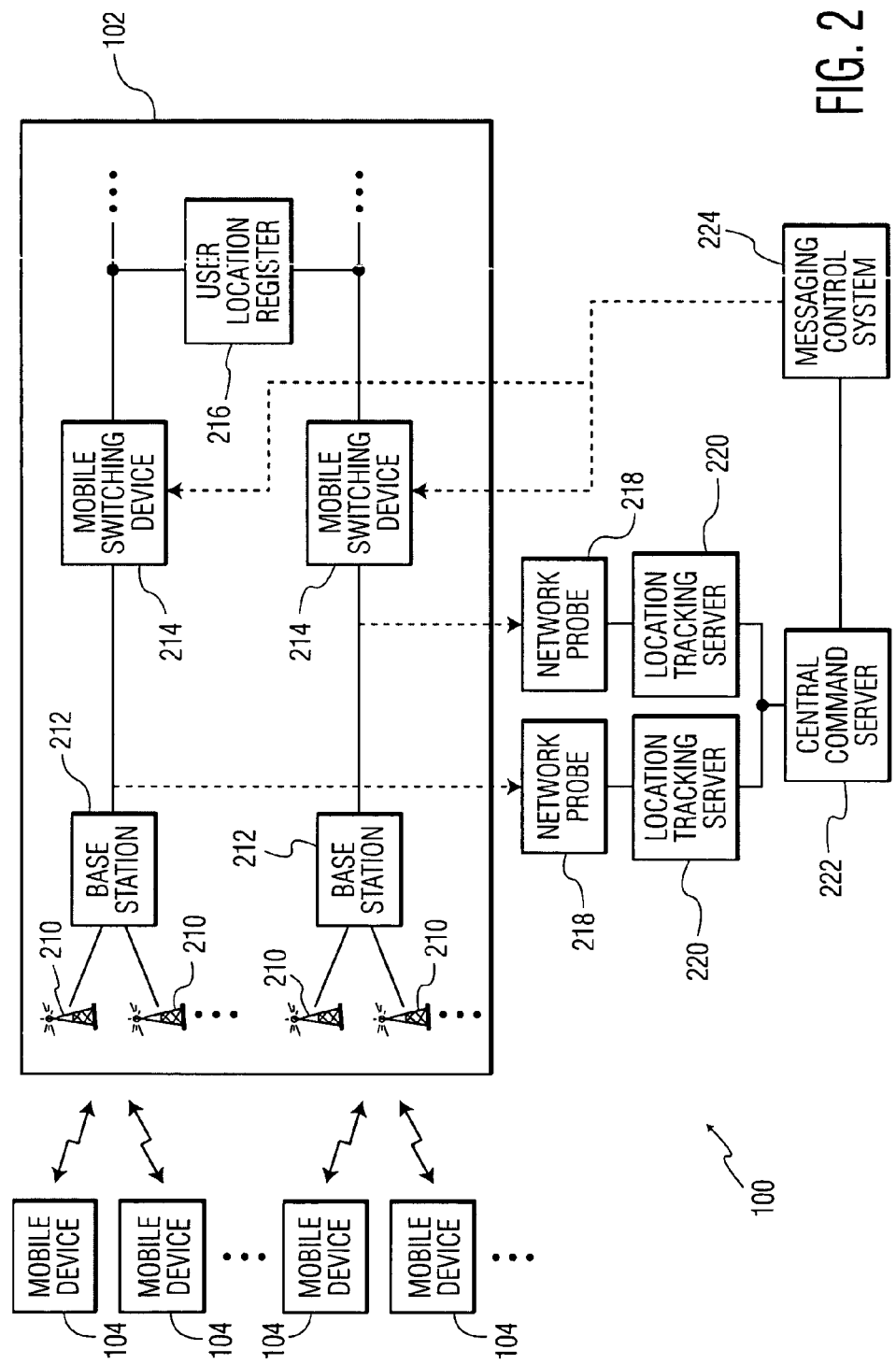
FIG. 2 is a block diagram of the location-based messaging system, which shows components of the location-based messaging system in accordance with an embodiment of the invention.

Turning now to FIG. 2, the components of the location-based messaging system 100 in accordance with an embodiment of the invention are shown. In FIG. 2, some components of the mobile access network 102 are also shown to better describe the location-based messaging system. In particular, signaling tower stations 210, base stations 212, mobile switching devices 214 and a user location register 216 of the mobile access network are shown. Each of the signaling tower stations includes an antenna tower and electronic components to receive and transmit wireless signals. The signaling tower stations may be base transmission stations (BTSs), Node Bs or other equivalent components, depending on the mobile access network. The base stations are connected to one or more signaling tower stations. The base stations may be base station controllers (BSCs), radio network controller (RNCs) or other equivalent components, depending on the mobile access network. The mobile switching devices may be mobile switching centers (MSCs) or other equivalent components, depending on the mobile access network. The user location register is operably connected to the mobile switching devices. The user location register includes subscriber information, such as account information, account status, user preferences and subscribed features, as well as user's current location. The user location register may be a home location register (HLR) or its equivalent database, depending on the mobile access network.

As illustrated in FIG. 2, the location-based messaging system 100 includes network probes 218, location tracking servers 220, a central command server 222 and a messaging control system 224. The location tracking servers, the central command server and the messaging control system may be located anywhere, for example, at the same or different locations. In some embodiments, the location tracking servers, the central command server and/or the messaging control system may be co-located with one or more components the mobile access network 102, i.e., situated at the same location as one or more components of the mobile access network. Each of the network probes is connected to a signal path between one of the base stations 212 and one of the mobile switching devices 214. As an example, the signal path may be an A-link between a base station and a mobile switching device. The network probes are configured to passively extract communication information between the base stations and the mobile switching devices, which includes at least mobile identifications, signal power readings and signaling tower identifications for the mobile communication devices 104 supported by the mobile access network 102. Other communication information extracted by the network probes includes identifications of the mobile switching devices associated with the communications, autonomous GPS information from the mobile communication devices and/or GPS location fixes from assisted GPS. In an embodiment, the network probes are configured to extract data of the communications between the base stations and the mobile switching devices by making copies of raw data transmitted between the base stations and the mobile switching devices.

The location tracking servers 220 are connected to the network probes 218 to receive the communication information between the base stations 212 and the mobile switching devices 214. Each location tracking server may be connected to more than one network probe to receive the communication information between multiple base stations and multiple mobile switching devices. The location tracking servers uses the received communication information to calculate the current locations of the mobile communication devices 104 supported by the mobile access network 102. The calculated locations of the mobile communications devices, as well as information about the mobile communications, are stored in one or more location databases.

Figure 3:
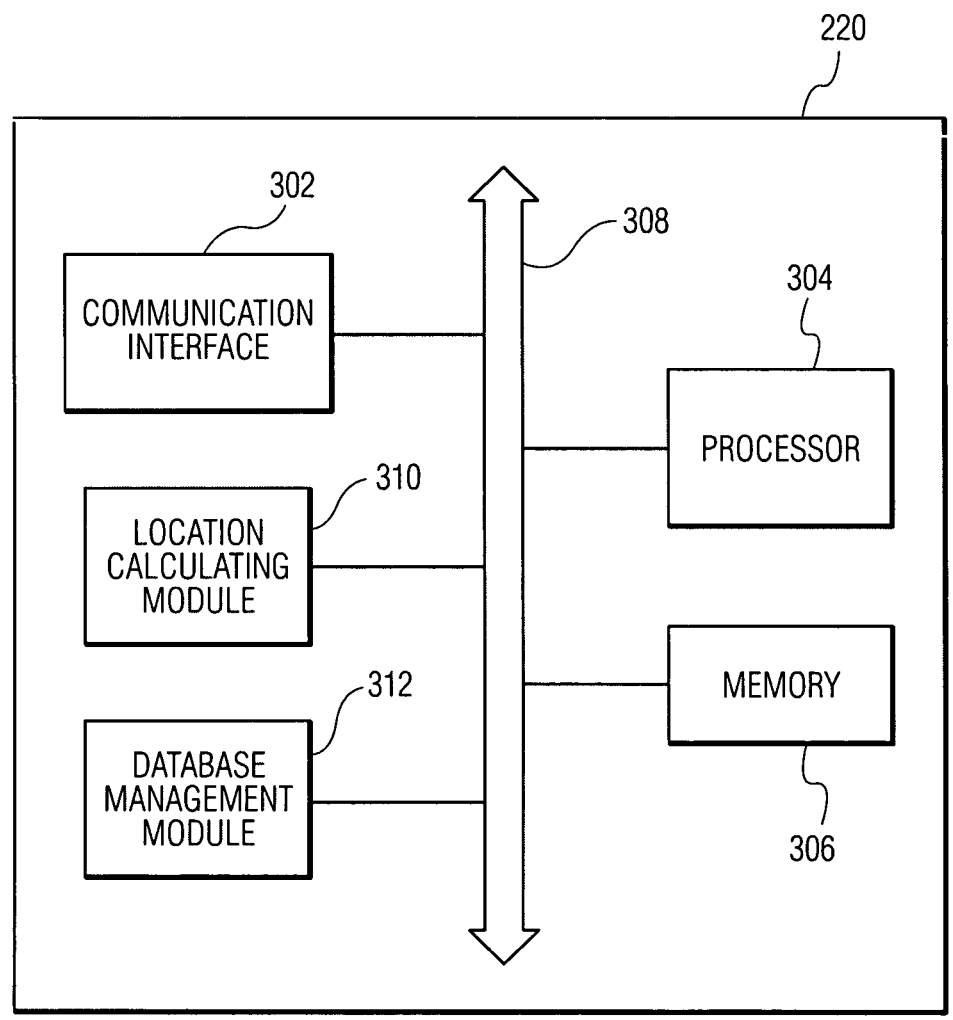
FIG. 3 is a block diagram of components of a location tracking server of the location-based messaging system in accordance with an embodiment of the invention.

Turning now to FIG. 3, components of one of the location tracking servers 220 in accordance with an embodiment of the invention are illustrated. As shown in FIG. 3, the location server includes a communication interface 302, at least one processor 304 and at least one memory 306 that are connected to a data bus 308. The communication interface enables communications with other devices, such as the central command server 222 and the network probes 218, via, for example, Internet Protocol (IP). The processor may include a multi-function processor and/or an application-specific processor. The processor can be any processor commonly found in a server. The memory can be any type of computer memory, such as read only memory (ROM), flash memory, random access memory (RAM) or a hard disk drive.

As shown in FIG. 3, the location tracking server 220 further includes a location calculating module 310 and a database management module 312. The location calculating module is configured to calculate the current locations of the mobile communication devices 104 using the communication information between one or more base stations 212 and one or more mobile switching devices 214 received from one or more network probes 218. In an embodiment, the location calculating module is configured to use the signal power reading and the signaling tower identification in the received communication information for each of the mobile communication devices specified in the received communication information to determine the current location of that mobile communication device. In this embodiment, the location calculating module is configured to use the signal power reading for a particular mobile communication device specified in the received communication information to determine the proximity of the mobile communication device to a particular signaling tower, which is specified by the signaling tower identification association with the signal power reading. The strength of the signal power reading indicates the distance between the mobile communication device and the particular signaling tower. That is, the strength of the signal power reading indicates how far the mobile communication device is currently positioned relative to the particular signaling tower. Since the exact location of the particular signaling tower is known, the distance from the particular signaling tower will define a circular region around the signaling tower with the distance being its radius in which the mobile communication device is located. Using this technique, a location accuracy of around 500-1000 meters for most cellular environments may be achieved.

In other embodiments, the location calculating module 310 may use additional information to increase the accuracy of the calculated locations of the mobile communication devices 104. In an embodiment, the signal power readings from multiple signaling towers for a particular mobile communication device may be used to narrow the region in which the mobile communication device is positioned using, for example, trilateration or other methods. In some embodiments, other information from the received communication information, such as sector information or angles of connection between the mobile communication device and the signaling towers, are used to narrow the region in which the mobile communication device is determined to be located. Using these techniques, a location accuracy of around 100-500 meters for most cellular environments may be achieved.

The database management module 312 is configured to store the calculated locations of the mobile communication devices 104 as location data, along with other information about the mobile communication devices, in at least one location database, which may be stored in the memory 306 or another memory accessible by the location tracking server 220. The other information stored in the location database may include the phone numbers, the International Mobile Subscriber Identities (IMSIs) and/or Temporary IMSIs (TIMSIs) of the mobile communication devices. The location database may be a timed database in which the data in the location database is retained only for a specified amount of time. One reason for using a timed database is that the calculated locations of the mobile communication devices will become stale or inaccurate over time, and thus, should not be used when significant amount of time has passed. In an embodiment, the specified amount of time that the data in the timed location database is retained may be configurable. The database management module is further configured to update the location database at a configurable time, for example, every minute or every 5 minutes, with newly calculated locations of the mobile communication devices so that location data of the latest calculated locations of the mobile communication devices are retained in the location database.

In an embodiment, the location calculating module 310 and the database management module 312 are implemented as software stored in a computer readable medium, such as the memory 306, which is executed by the processor 304 to perform the functions of the modules. However, in other embodiments, the location calculating module and the database management module may be implemented in any combination of software, firmware and hardware.

Turning back to FIG. 2, the central command server 222 is connected to the location tracking servers 220. The central command server is configured to control and manage the location tracking servers. The central command server may also perform maintenance operations to ensure that the location tracking servers are functioning properly. The central command server is also configured to access the location databases being maintained by the location tracking servers to retrieve the location data and other information about the mobile communication devices 104 stored in the location databases. Similar to the location tracking servers, the central command server includes a communication interface, at least one processor and at least one memory. In some embodiments, the functions of the central command server may be performed by one of the location based servers or the messaging control system 224.

In the illustrated embodiment, the messaging control system 224 is connected to the central command server 222. The messaging control system is configured to generate location-based messages, including notifications, to be sent to the mobile communication devices 104 based on their latest calculated locations. Thus, the location-based messages can be directed to only the mobile communication devices that are located in a specified geographical area. The location-based messages can be any type of messages, which may include text, graphics, images, videos and/or audios. As an example, the location-based messages may be audio phone messages, short message service (SMS) messages or multimedia message service (MMS) messages. The location-based messages may be messages for any purpose. As an example, the messages generated and transmitted by the messaging control system may be commercial advertisements for a particular area or neighborhood. As another example, the messages transmitted by the messaging control system may be emergency notifications for a particular area.

The messaging control system 224 includes an application programming interface (API) that an entity can use to interface with the messaging control system to send location-based messages. The API is configured so that the entity can enter content of the location-based messages, as well as the targeted geographical area to send the location-based messages to the mobile communication devices 104 that are located within the targeted geographical area. Thus, the API is used to create the location-based messages to be transmitted. The messaging control system uses the location data of the latest calculated locations stored in the location databases maintained by the location tracking servers 220 to identify the mobile communication devices that are located within the targeted geographical area as specified in the location data. The messaging control system also uses the information about the identified mobile communication devices, such as the phone numbers, IMSIs or TIMSIs, to route the location-based messages to the identified mobile communication devices. Thus, the messaging control system does not have to retrieve any data from the user location register 216 of the mobile access network 102 to send the location-based messages to the identified mobile communication devices, unlike messages sent in accordance with signaling system 7 (SS7) or control plane location. The data stored in the location databases that are needed to send the location-based messages may be accessed using the central control server 222 or may be accessed directly by the messaging control system.

Using the necessary data stored in the location databases, the messaging control system 224 sends the location-based messages to the mobile communication devices 104 that have been identified as being located within the targeted geographical area via the mobile access network 102. Since the messaging control system does not have to access the data stored in the user location register 216 of the mobile access network, the messaging control system can send location-based messages more rapidly than conventional messaging methods. In some embodiments, the messaging control system may be configured to function as a short message service center (SMSC) and/or a multimedia message service center (MMSC). In these embodiments, the location-based message in the form of SMS or MMS messages may be routed directly from the messaging control system to the appropriate mobile switching devices 214 of the mobile access network to the identified mobile communication devices that are located within the targeted geographical area. The appropriate mobile switching devices for the identified mobile communication devices are known to the messaging control system via the location tracking servers 220 from the data of the communications between the base stations 212 and the mobile switching devices extracted by the network probes 218. By sending the location-based SMS or MMS messages directly to the mobile switching devices, the messaging control system can more quickly send the location-based SMS or MMS messages to the identified mobile communication devices than convention process of sending SMS or MMS messages.

In an embodiment, the messaging control system 224 may be implemented as one or more servers, each of which includes a communication interface, at least one processor and at least one memory, similar to the location tracking servers 220. In other embodiments, the messaging control system may be incorporated into other existing components, such as the central command server 222 or a component of the mobile access network 102.

Figure 4:
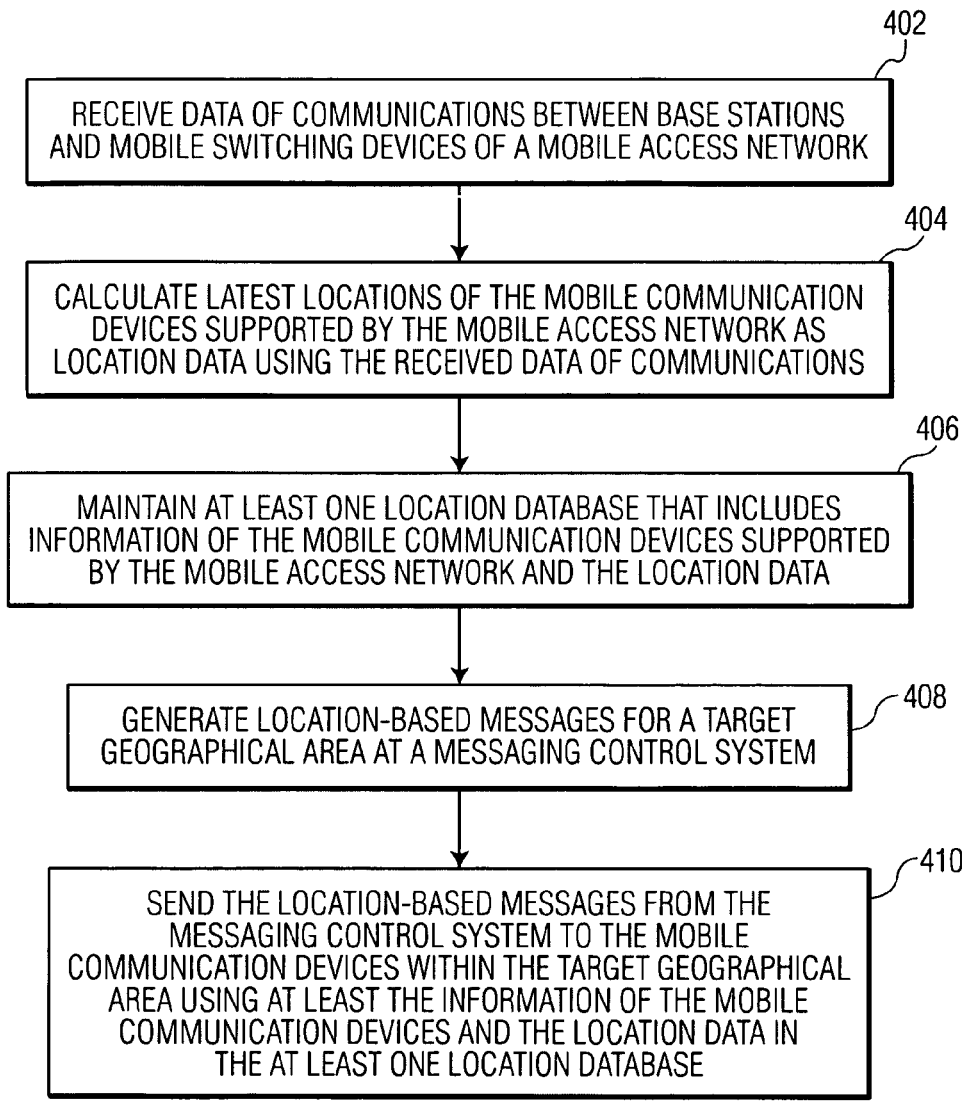
FIG. 4 is a flow diagram of a method for sending location-based messages to mobile communication devices in accordance with an embodiment of the invention.

A method for sending location-based messages to mobile communication devices in accordance with an embodiment of the invention is described with reference to a flow diagram of FIG. 4. At block 402, data of communications between base stations and mobile switching devices of a mobile access network is received. At block 404, latest locations of the mobile communication devices supported by the mobile access network are calculated as location data using the received data of communications between the base stations and the mobile switching devices. At block 406, at least one location database that includes information of the mobile communication devices supported by the mobile access network and the location data is maintained. At block 408, the location-based messages for a target geographical area are generated at a messaging control system. At block 410, the location-based messages are sent from the messaging control system to the mobile communication devices within the target geographical area using at least the information of the mobile communication devices supported by the mobile access network and the location data that corresponds to the latest locations of the mobile communication devices in the at least one location database.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A location-based messaging system comprising:
a plurality of location tracking servers operably coupled to a mobile access network to receive data of communications between base stations and mobile switching devices of the mobile access network, each of the location tracking servers being configured to calculate latest locations of a plurality of mobile communication devices supported by the mobile access network as location data using the received data of communications, the location tracking servers being further configured to maintain at least one location database that includes information of the plurality of mobile communication devices supported by the mobile access network and the location data; and
a messaging control system operably coupled to the location tracking servers, the messaging control system being configured to generate location-based messages for a target geographical area and to send the location-based messages to the mobile communication devices within the target geographical area using at least the information of the mobile communication devices supported by the mobile access network and the location data that corresponds to the latest locations of the mobile communication devices in the at least one location database, the location-based messages being one of short message service (SMS) messages and multimedia message service (MMS) messages,
said messaging control system being configured to function as one of a short message service center (SMSC) and a multimedia message service center (MMSC) and being configured to identify appropriate mobile switching devices associated with the mobile communication devices on the basis of data held by the location tracking servers,
wherein the messaging control system is directly connected to mobile switching devices of the mobile access network so that the location-based messages in the form of SMS or MMS messages are routed directly from the messaging control system to the identified mobile switching devices and then to the mobile communication devices within the target geographical area.

2. The system of claim 1, wherein the location tracking servers are coupled to network probes that are coupled to signal paths between the base stations and the mobile switching devices to receive the data of communications between the base stations and the mobile switching devices.

3. The system of claim 2, wherein the location tracking servers are coupled to the network probes to receive copies of raw data transmitted between the base stations and the mobile switching devices of the mobile access network.

4. The system of claim 1, wherein the base stations are base station controllers (BSCs) and the mobile switching devices are mobile switching centers (MSCs), and wherein the location tracking servers are operably coupled to the mobile access network to receive the data of communications between the BSCs and the MSCs via A-links.

5. The system of claim 1, wherein the base stations are radio network controllers (RNCs), and wherein the location tracking servers are operably coupled to the mobile access network to receive the data of communications between the RNCs and the mobile switching devices.

6. The system of claim 1, wherein the data of communications between the base stations and the mobile switching devices of the mobile access network includes mobile identifications, signal power readings and signaling tower identifications, and wherein the location tracking servers are configured to calculate the latest locations of the mobile communication devices supported by the mobile access network using the mobile identifications, the signal power readings and the signaling tower identifications.

7. The system of claim 1, wherein the messaging control system is configured to send the location-based messages without accessing any data from a user location register of the mobile access network.

8. The system of claim 7, wherein the user location register is a home location register (HLR) of the mobile access network, and wherein the messaging control system is configured to send the location-based messages without accessing any data from the HLR of the mobile access network.

9. A method for sending location-based messages to a plurality of mobile communication devices, the method comprising:

receiving data of communications between base stations and mobile switching devices of a mobile access network;

calculating latest locations of the plurality of mobile communication devices supported by the mobile access network as location data using the received data of communications between the base stations and the mobile switching devices;

maintaining at least one location database that includes information of the plurality of mobile communication devices supported by the mobile access network and the location data;

generating location-based messages for a target geographical area at a messaging control system, the location-based messages being one of short message service (SMS) messages and multimedia message service (MMS) messages, and said messaging control system being configured to function as one of a short message service center (SMSC) and a multimedia message service center (MMSC);

and sending the location-based messages from the messaging control system to the mobile communication devices within the target geographical area using at least the information of the mobile communication devices supported by the mobile access network and the location data that corresponds to the latest locations of the mobile communication devices in the at least one location database;

wherein the messaging control system is configured to identify appropriate mobile switching devices associated with the mobile communication devices on the basis of data held by the location tracking servers; and, wherein the messaging control system is directly connected to mobile switching devices of the mobile access network so that the location-based messages in the form of SMS or MMS messages are routed directly from the messaging control system to the identified mobile switching devices and then to the mobile communication devices within the target geographical area.

10. The method of claim 9, wherein the receiving the data of communications includes receiving the data of communications between the base stations and the mobile switching devices of the mobile access network from network probes that are coupled to signal paths between the base stations and the mobile switching devices.

11. The method of claim 10, wherein the receiving the data of communications includes receiving copies of raw data transmitted between the base stations and the mobile switching devices of the mobile access network from the network probes.

12. The method of claim 9, wherein the base stations are base station controllers (BSCs) and the mobile switching devices are mobile switching centers (MSCs), and wherein the receiving the data of communications includes receiving the data of communications between the BSCs and the MSCs via A-links.

13. The method of claim 9, wherein the base stations are radio network controllers (RNCs), and wherein the receiving the data of communications includes receiving the data of communications between the RNCs and the mobile switching devices.

14. The method of claim 9, wherein the data of communications between the base stations and the mobile switching devices of the mobile access network includes mobile identifications, signal power readings and signaling tower identifications, and wherein the calculating the latest locations of the mobile communication devices includes calculating the latest locations of the mobile communication devices supported by the mobile access network using the mobile identifications, the signal power readings and the signaling tower identifications.

15. The method of claim 9, wherein the sending the location-based messages includes sending the location-based messages from the messaging control system to the mobile communication devices within the target geographical area without accessing any data from a user location register of the mobile access network.

16. The method of claim 15, wherein the user location register is a home location register (HLR) of the mobile access network, and wherein the sending the location-based messages includes sending the location-based messages from the messaging control system to the mobile communication devices within the target geographical area without accessing any data from the HLR of the mobile access network.

17. A location-based messaging system comprising:

a plurality of network probes coupled to signal paths between base stations and mobile switching devices of a mobile access network to extract data of communications between the base stations and the mobile switching devices;

a plurality of location tracking servers operably coupled to the network probes to receive the data of communications extracted by the network probes, each of the location tracking servers being configured to calculate latest locations of a plurality of mobile communication devices supported by the mobile access network as location data using the received data of communications between the base stations and the mobile switching devices, the location tracking servers being further configured to maintain at least one location database that includes information of the plurality of mobile communication devices supported by the mobile access network and the location data that corresponds to the latest locations of the mobile communication devices; and a messaging control system operably coupled to the location tracking servers, the messaging control system being configured to generate location-based messages for a target geographical area and to send the location-based messages to the mobile communication devices within the target geographical area using at least the information of the mobile communication devices supported by the mobile access network and the location data that corresponds to the latest locations of the mobile communication devices in the at least one location database, the location-based messages being one of short message service (SMS) messages and multimedia message service (MMS) messages, said messaging control system being configured to function as one of a short message service center (SMSC) and a multimedia message service center (MMSC) and being configured to identify appropriate mobile switching devices associated with the mobile communication devices on the basis of data held by the location tracking servers;

wherein the messaging control system is directly connected to mobile switching devices of the mobile access network so that the location-based messages in the form of SMS or MMS messages are routed directly from the messaging control system to the identified mobile switching devices and then to the mobile communication devices within the target geographical area.

18. The system of claim 17, wherein the messaging control system is configured to send the location-based messages without accessing any data from a home location register (HLR) of the mobile access network.

* * * * *